(12) United States Patent
Vandivier

(10) Patent No.: US 7,571,102 B2
(45) Date of Patent: Aug. 4, 2009

(54) CONTROLLER FOR USE WITH A MOTOR VEHICLE

(75) Inventor: Karl Douglas Vandivier, Belleville, MI (US)

(73) Assignee: Ford Motor Company, Dearborn, MI (US)

( * ) Notice: Subject to any disclaimer, the term of this patent is extended or adjusted under 35 U.S.C. 154(b) by 616 days.

(21) Appl. No.: 10/249,656

(22) Filed: Apr. 29, 2003

(65) Prior Publication Data

US 2004/0220811 A1 Nov. 4, 2004

(51) Int. Cl.
*G10L 21/00* (2006.01)

(52) U.S. Cl. .......... 704/275; 704/270
(58) Field of Classification Search .......... 704/270–275
See application file for complete search history.

(56) References Cited

U.S. PATENT DOCUMENTS

| | | | | |
|---|---|---|---|---|
| 4,307,461 A | * | 12/1981 | Brickman et al. | 379/269 |
| 4,392,125 A | * | 7/1983 | Iwata | 340/518 |
| 4,506,377 A | * | 3/1985 | Kishi et al. | 704/275 |
| 4,656,651 A | * | 4/1987 | Evans et al. | 379/15.03 |
| 4,908,858 A | * | 3/1990 | Ohno | 381/1 |
| 4,922,538 A | * | 5/1990 | Tchorzewski | 704/247 |
| 4,962,523 A | | 10/1990 | Tanaka | |
| 5,086,385 A | * | 2/1992 | Launey et al. | 700/83 |
| 5,185,803 A | | 2/1993 | Moyski et al. | |
| 5,255,326 A | * | 10/1993 | Stevenson | 381/110 |
| 5,261,121 A | | 11/1993 | Hashimoto | |
| 5,566,271 A | * | 10/1996 | Tomitsuka et al. | 704/275 |
| 5,704,008 A | * | 12/1997 | Duvall, Jr. | 704/273 |
| 5,857,172 A | * | 1/1999 | Rozak | 704/275 |
| 6,111,964 A | | 8/2000 | Ishibashi | |
| 6,154,658 A | * | 11/2000 | Caci | 455/466 |
| 6,192,340 B1 | * | 2/2001 | Abecassis | 704/270 |
| 6,229,880 B1 | * | 5/2001 | Reformato et al. | 379/88.01 |
| 6,230,138 B1 | * | 5/2001 | Everhart | 704/275 |
| 6,233,559 B1 | * | 5/2001 | Balakrishnan | 704/275 |
| 6,243,685 B1 | * | 6/2001 | Welch et al. | 704/276 |
| 6,473,509 B2 | * | 10/2002 | Albus et al. | 381/71.4 |
| 6,598,018 B1 | * | 7/2003 | Junqua | 704/251 |
| 6,757,655 B1 | * | 6/2004 | Besling et al. | 704/270.1 |
| 6,937,701 B1 | * | 8/2005 | Gold | 379/88.01 |
| 2003/0081796 A1 | * | 5/2003 | Bray et al. | 381/86 |
| 2005/0020223 A1 | * | 1/2005 | Ellis et al. | 455/186.1 |

\* cited by examiner

*Primary Examiner*—Richemond Dorvil
*Assistant Examiner*—E. Yen
(74) *Attorney, Agent, or Firm*—Jennifer Stec; Brooks Kushman P.C.

(57) ABSTRACT

A controller for use in a vehicle having a number of modules that can listen to a microphone signal. The controller comprises a router and a microprocessor. The controller can route the microphone signal to each of the modules. The microprocessor can authorize at least one of the modules to listen to the microphone signal.

24 Claims, 2 Drawing Sheets

CONTROLLER FOR USE WITH A MOTOR VEHICLE

BACKGROUND OF INVENTION

1. Field of the Invention

The present invention relates to a controller for use with a motor vehicle having a number of modules that can listen to a microphone signal.

2. Background Art

Motor vehicles can include a number of modules, such as, a voice-recognition module, a radio module, a navigation module, a phone module, a compact disc player module, a global positioning module, an emergency contact module and others. Some of the modules, like the voice-recognition module or the navigation module, may be able to listen to a microphone signal for use in controlling the module.

In the past, the modules that could listen to the microphone signal were connected in a series or daisy-chain arrangement. If one of the serially connected modules becomes inoperable, any subsequent module is unable to receive the microphone signal, unless there is a bypass around the inoperable module.

SUMMARY OF INVENTION

One aspect of the invention relates to a controller for use in a vehicle having a number of modules that can listen to a microphone signal. The controller includes a router configured for receiving the microphone signal. The router separately routes the microphone signal to each of the modules. The control further includes a microprocessor for transmitting a microphone authorization signal to at least one of the modules. The module receiving the authorization signal is authorized to listen to the routed microphone signal.

Another aspect of the present invention relates to a system. The system includes a vehicle having a number of modules that can listen to a microphone signal. The system further includes a controller configured for receiving the microphone signal and separately routing the received microphone signal to each of the modules. The controller is further configured for transmitting a microphone authorization signal to at least one of the modules for authorizing the module to listen to the routed microphone signal.

DETAILED DESCRIPTION

Figure 1:
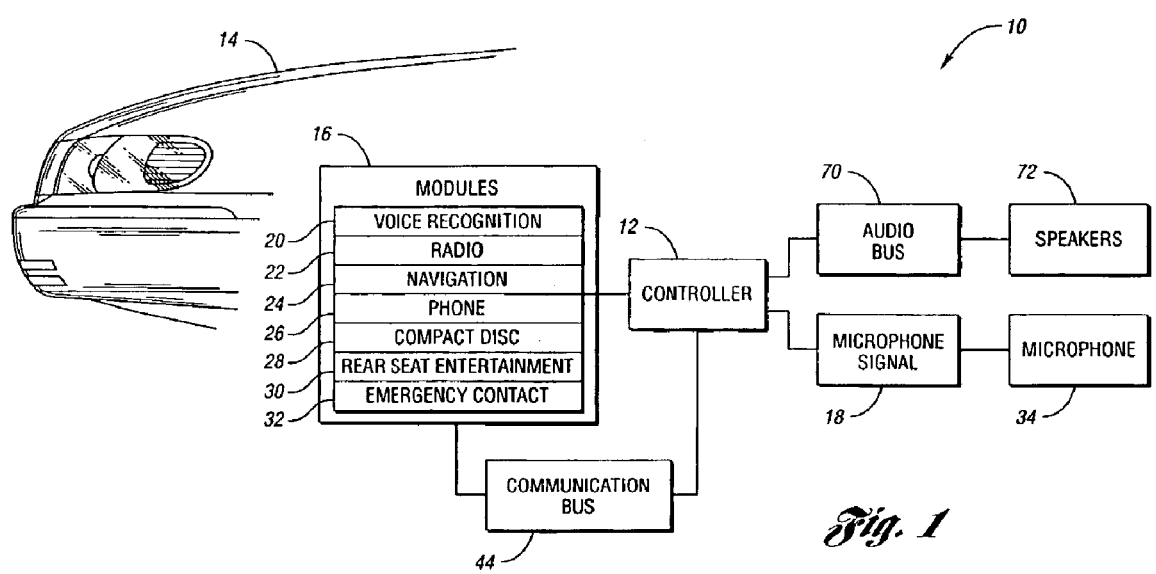
FIG. 1 illustrates a system for use with a motor vehicle, according to one aspect of the present invention.

FIG. 1 illustrates a system 10 according to one aspect of the present invention. The system 10 includes a controller 12 and vehicle 14. The vehicle 14 includes modules 16 that can listen to a microphone signal 18.

Vehicles 14, especially passenger vehicles, can include a number of modules 16. Some of the more common modules include a voice-recognition module 20, a radio module 22, a navigation module 24, a phone module 26, a compact disc player module 28, a rear seat entertainment module 30, and an emergency contact module 32. Some or all of these modules 16 can listen to the microphone signal 18 transmitted from a microphone 34.

Listening to the microphone signal 18 comprises the ability to receive the microphone signal 18 and to understand the information of the microphone signal 18. In this way, the modules 14 are able to respond to voice commands carried by the microphone signal 18 for use in controlling the operation of the modules 14.

Figure 2:
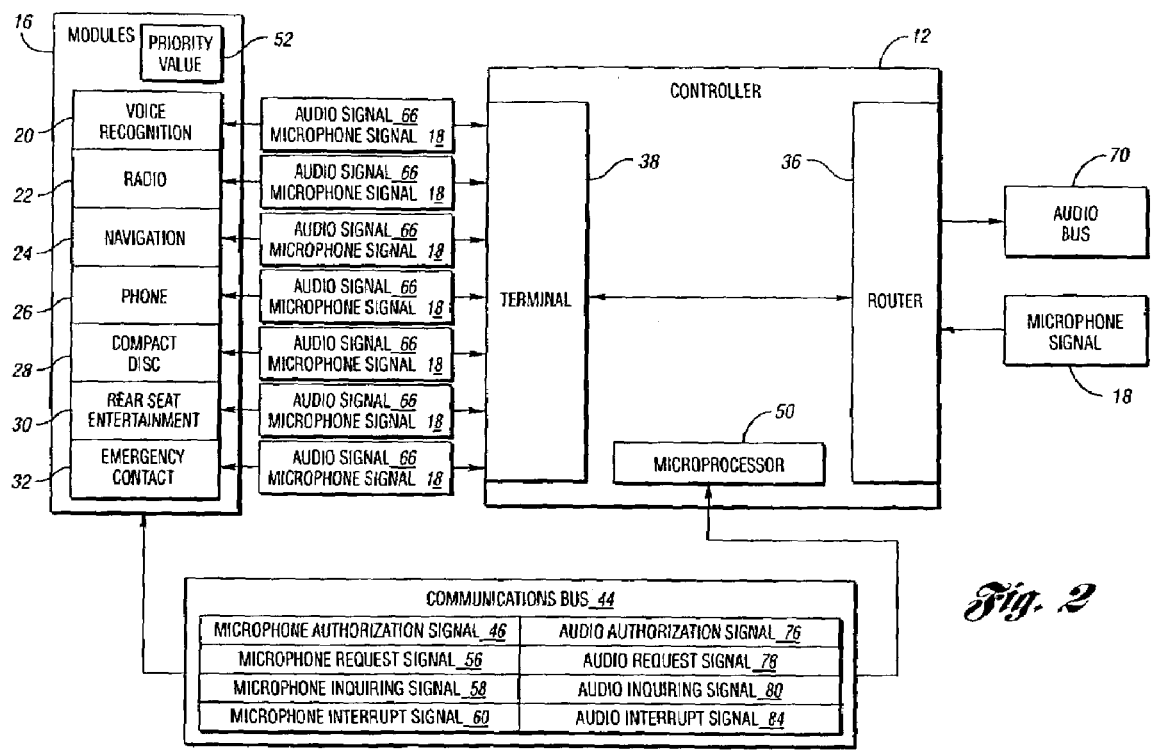
FIG. 2 illustrates a controller, according to one aspect of the present invention.

One aspect of the present invention relates to routing the microphone signal 18 through the controller 12 and to each of the modules 16. As shown in FIG. 2, the controller 12 includes a router 36 and router terminals 38 for receiving the microphone signal 18 and separately routing the microphone signal 18 to each of the modules 16.

The router 36 is a passive, slave router that acts as a type of hub for routing the microphone signal 18 to each of the modules 16. The router 36 can connect to multiple microphones and route each received microphone signal to the modules 16.

To receive the microphone signal 18, each module 16 needs to be connected to the controller 12. For this purpose, the controller 12 includes the router terminals 38. The terminals 38 can be part of the router 36 or otherwise in electrical communication with the router 36. The router 36 receives the microphone signal 18 and the terminals 38 relay the microphone signal 18 to each connected module 16. The terminal 38 can include extra ports or terminals for connecting additional modules 16.

The ability to connect extra modules 16 allows for after-market modules 16 that can listen to the microphone signal 18 to be added without having to undertake expensive alterations. In addition, the vehicle 12 does not have to include bypass wiring and other redundant configurations in order to maintain the ability to add additional after-market modules 16. Since the router 36 is hub, and not a daisy-chain arrangement, any number of modules 16 can be connected to the terminal 38 and receive the microphone signal 18. Moreover, if one module 16 becomes inoperable, the other modules 16 can still receive the microphone signal 18. The modules 16 are not dependent on each other, like serially connected or daisy-chained modules.

As the router 36 is a passive device, it does not discriminate amongst the modules 16 receiving the microphone signal 18. Rather, each module 16 receives the microphone signal 18 and each module 16 must decide whether to listen to the microphone signal 18. A communications bus 44, as shown in FIG. 1, is provide for the controller 12 to communicate with each of the modules 16 to control the listening decisions of the modules 16.

The controller 12 uses the communication bus 44 for sending signals to the modules 16 for controlling which module is authorized to listen to the microphone signal 18. Even though each module 16 receives the microphone signal 18, the controller 12 can control which one or more modules 16 decide to listen to the microphone signal 18.

As shown in FIG. 2, the controller 12 is configured to transmit a microphone authorization signal 46 over the communication bus 44. The authorization signal 46 can be addressed to a predetermined address that corresponds with one of the modules 16. For example, if it would be desirable to authorize the phone module 26 to listen to the microphone signal 18, the controller 12 would include an address for the microphone authorization signal 46 that corresponds with the phone module 26.

While each module 16 is connected to the communications bus 44 and thereby receives the authorization signal, only the module 16 having the address that corresponds with the address of the authorization signal 46 is capable of being authorized by the microphone authorization signal to listen to the microphone signal 18. In this respect, the controller 12 can selectively determine which module 16 is authorized to listen to the microphone signal 18.

The controller 12 can include a microprocessor 50 for selecting which one of the modules 16 is authorized to listen to the microphone signal 18. The microprocessor 50 can be any type of computer-readable or otherwise programmable device. The microprocessor 50 can transmit the microphone authorization signal 46 and receive signals for selecting where to address the microphone authorization signal 46. The signals can originate from the modules 16 or other devices.

According to one aspect of the present invention, the signals used for selecting the module 16 come from the modules 16. Each module 16 is configured with a predefined priority value 52. The predefined priority value 52 is assigned to the signals originating from the modules 16 and the microprocessor 50 can determine the priority value 52 from the signals for selecting which one of the modules 16 is authorized to listen to the microphone signal 18.

When one of the modules 16 desires to listen to the microphone signal 18, the module 16 can transmit a microphone request signal 56 to the microprocessor 50 over the communications bus 44. If multiple modules 16 desire to listen to the microphone signal 18, then multiple microphone request signals 56 are transmitted to the communications bus 44. Each microphone request signal 56 incorporates the priority value 52 of the module 16 that transmitted the microphone request signal 56.

The microprocessor 50 is in communication with the communication bus 44 and reviews each received microphone request signal 56. According to one aspect of the present invention, the microprocessor 50 can determine which one of the modules 16 transmitting the microphone request signal 56 has the highest priority value 52. For this purpose, microprocessor 50 can include a memory (not shown). The memory can be used for storing the priority values 52 in a predetermined prior table for comparison with the received microphone request signals 56, or the memory can include a program or algorithm that interprets the priority value 52 for each microphone request 56 against the other received microphone requests 56. Once the module 16 with the highest priority value is determined, the microprocessor 50 addresses the microphone authorization signal 46 to the module 16 having the highest priority value 52.

Once one of the modules 16 is authorized to listen to the microphone signal 18, the controller 12 can operate in a number of different modes for changing which module 16 is authorized to listen to the microphone signal 18.

One mode is referred to as periodic multiplex. In this mode, the microprocessor 50 continuously or intermittently monitors the communications bus 44 to determine whether any new microphone request signals were transmitted by the modules 16. In response to a new microphone request signal 56, the microprocessor 50 again determines which one of the modules 16 transmitting the microphone request signal 56 has the highest priority value 52. If the new microphone request signal 56 has a higher priority value than the priority value 52 of the module 16 currently authorized to listen to the microphone signal 18, then the microprocessor 50 changes the address of the microphone authorization signal 46 to the address of the new module 16 transmitting the higher priority value 52.

Another mode is referred to as state change. In this mode, the microprocessor 50 transmits a microphone inquiry signal 58 to the modules 16 over the communications bus 44. Upon receipt of the inquiry signal 58, the modules 16, if they desire to listen to the microphone signal 18, can respond to the microphone inquiry signal 58 by transmitting the microphone request signal 56. In state change mode, the modules 16 are not permitted to transmit a microphone request signal 56 to the microprocessor 50 unless enabled by the microphone inquiry signal 58.

In either periodic multiplex mode or state change mode, one of the authorized modules 16 may need to listen to the microphone signal 18. For example, in periodic multiplex mode, a module 16 may need to listen to the microphone signal 18 even though the module 16 does not have the highest priority value 52, and, in state change mode, a module 16 may need to listen to the microphone signal 18 even though no microphone inquiry signal 58 is enabling the module 16 to transmit the microphone request signal 56. In both cases, an unauthorized module 16 can override the mode by transmitting a microphone interrupt signal 60.

In periodic multiplex mode, the microphone interrupt signal 60 causes the microprocessor to select the module 16 having the highest priority value 52 out of the modules 16 transmitting the microphone interrupt signal 60, instead of the modules 16 transmitting the microphone request signal 56. As such, a module 16 with a lower priority value 52 can interrupt a module 16 having a higher priority value 52 by transmitting an microphone interrupt signal 60 as long as the module 16 having the higher priority value 52 is only transmitting a microphone request signal 56 and not a microphone interrupt signal 60.

In state change mode, the modules 16 do not have to wait for the microphone inquiry signal 58 before transmitting a microphone interrupt signal 60. Rather, the modules 16 transmit the microphone interrupt signal 60 and the microprocessor 50 is prompted to authorize the module 16 having the highest priority value 52 out of the modules 16 transmitting the microphone interrupt signal 60 to listen to the microphone signal 18.

In addition to some of the modules 16 being capable of listening to a microphone signal 18, some of the modules 16 may be capable of generating an audio signal 66. The router terminals 38 can receive the audio signals 66 and router 36 can route the audio signals 66 to an audio bus 70. Alternatively, another router or other device could be used. The terminal 38 can include extra ports or terminals for connecting additional audio signals 66 generating modules 16 to the controller 12. In addition, modules 16 can be connected that only generate audio signal 66 and that cannot listen to the microphone signal 18. As shown in FIG. 1, the audio bus 70 relays the audio signals 66 to a set of speakers 72. The speakers 72 broadcast the sounds defined by the audio signal 66.

The ability to connect extra modules 16 allows for aftermarket modules 16 that can transmit the audio signal 66 to be added without having to undertake expensive alterations. In addition, the vehicle 12 does not have to include bypass wiring and other redundant configurations in order to maintain the ability to add additional after-market modules 16. Since the router 36 is hub, and not a daisy-chain arrangement, any number of modules 16 can be connected to the terminal 38 for transmitting the audio signal 66. Moreover, if one module 16 becomes inoperable, the other modules 16 can still transmit the audio signal 66. The modules 16 are not dependent on each other like serially connected or daisy-chained modules are for transmitting the audio signal 66 to the audio bus 70.

If more than one module 16 transmits an audio signal 66 at the same time, more than one sound is broadcast by the speakers 72. The controller 12 prevents more than one module 16 from transmitting a audio signal 66 at the same time.

The controller 12 is configure to transmit an audio authorization signal 76 over the communication bus 44 for authorizing one module 16 to transmit the audio signal. Like the microphone authorization signal 46, the audio authorization signal 76 can be addressed to a predetermined address that corresponds with one of the modules 16. Only the module 16 to which the audio authorization signal 16 is addressed is authorized to transmit the audio signal 66 and the other modules are unable to transmit audio signal 66 without such authorization. For example, if it would be desirable to authorize the phone module 26 to transmit an audio signal 66, the controller 12 would include an address for the audio authorization signal 76 that corresponds with the phone module 26.

When one of the modules 16 desires to transmit the an audio signal 66, the module 16 can transmit a audio request signal 78 to the microprocessor 50 over the communications bus 44. If multiple modules 16 desire to listen to the audio signal 18, then multiple audio request signals 78 are received by the microprocessor 50.

The audio request signals 78 incorporate the priority value 52 of the module 16 that transmitted the audio request signal 78. The microprocessor 50 reviews each received audio request signal 78 to determine which one of the modules 16 transmitting the audio request signal 78 has the highest priority value 52. The microprocessor 50 addresses the audio authorization signal 76 to the module 16 having the highest priority value 52.

Once one of the modules 16 is authorized to transmit the audio signal 66, the controller 12 can operate in a number of different modes for changing which module 16 is authorized to listen to the audio signal 18.

One mode, as referred to above, is periodic multiplex. In this mode, the microprocessor 50 continuously or intermittently monitors the communications bus 44 to determine whether any new audio request signals 78 were transmitted by the modules 16. In response to a new audio request signal 78, the microprocessor 50 again determines which one of the modules 16 transmitting the audio request signal 78 has the highest priority value 52. If the new audio request signal 78 has a higher priority value than the priority value 52 of the module 16 currently authorized to transmit the audio signal 66, then the microprocessor 50 changes the address of the audio authorization signal 76 to the address of the new module 16 transmitting the higher priority value 52.

Another mode, as referred to above, is state change. In this mode, the microprocessor 50 transmits a audio inquiry signal 80 to the modules 16 over the communications bus 44. Upon receipt of the audio inquiry signal 80, the modules 16, if they desire to transmit the audio signal 66, can respond to the audio inquiry signal 80 with the audio request signal 78. In state change mode, the modules 16 are not permitted to transmit a audio request signal 78 to the microprocessor 50, unless enabled by the microprocessor 50.

In either periodic multiplex mode or state change mode, one of the unauthorized modules 16 may need to transmit the audio signal 66. For example, in periodic multiplex mode, a module 16 may need to transmit the audio signal 66 even though the module 16 does not have the highest priority value 52, and, in state change mode, a module 16 may need to transmit the audio signal 66 even though no audio inquiry signal 80 is enabling the module 16 to transmit the audio request signal 78. Each module 16 can override the mode by transmitting a audio interrupt signal 84.

In periodic multiplex mode, the audio interrupt signal 84 causes the microprocessor 50 to select the module 16 having the highest priority value 52 out of the modules 16 transmitting the audio interrupt signal 80, instead of the modules 16 transmitting the audio request signal 78. As such, a module 16 with a lower priority value 52 can interrupt a module 16 having a higher priority value 52 by transmitting an audio interrupt signal 84 as long as the module 16 having the higher priority value 52 is only transmitting a audio request signal 78 and not a audio interrupt signal 84.

In state change mode, the modules 16 do not have to wait for the audio inquiry signal 80 before transmitting a audio interrupt signal 84. Rather, the modules 16 transmit the audio interrupt signal 84 and the microprocessor 50 is prompted to authorize the module 16 having the highest priority value 52 out of the modules 16 transmitting the audio interrupt signal 84 to transmit the audio signal 66.

While the best mode for carrying out the invention has been described in detail, those familiar with the art to which this invention relates will recognize various alternative designs and embodiments for practicing the invention as defined by the following claims.

The invention claimed is:

1. A controller for use in a vehicle having a number of modules configured to operate as a function of information carried in a microphone signal, wherein each module includes voice recognition capabilities that allow the modules to translate the microphone signal into a command signal sufficient to control operation of the module, the controller comprising:
   a router configured to receive the microphone signal from a microphone in the vehicle and to simultaneously route the microphone signal to each of the modules such that each module receives the same microphone signals prior to the microphone signals being translated into command signals; and
   a microprocessor for transmitting a microphone authorization signal for authorizing one of the modules to process the routed microphone signal such that only the authorized module processes the microphone signal, wherein the processing of the microphone signals includes translating the microphone signals into command signals sufficient to control operation of the module.

2. The controller of claim 1 wherein the microprocessor is configured to select the module having a highest priority value based on a predefined priority value for each module and to authorize the module having the highest priority value to process the microphone signal.

3. The controller of claim 2 wherein the microprocessor is configured to receive microphone request signals from the modules and to authorize the module having the highest priority value out of the modules communicating microphone request signals to process the microphone signal.

4. The controller of claim 3 wherein the microprocessor is configured to transmit microphone inquiry signals to the modules for enabling each module to transmit the microphone request signal, and wherein the microprocessor is further configured to authorize the module having the highest priority value out of the modules enabled to communicate the microphone request signals to process the microphone signal.

5. The controller of claim 2 wherein the microprocessor is configured to receive microphone interrupt signals from the modules and to authorize the module having the highest priority value out of the modules communicating microphone interrupt signals to process the microphone signal in place of the module previously authorized to process the microphone signal.

6. The controller of claim 2 wherein the router is configured to receive audio signals from each of the modules and to route only one of the received audio signal to an audio bus in the vehicle.

7. The controller of claim 6 wherein the microprocessor is configured to select the module having a highest priority value based on a predefined priority value for each module and to authorize the module having the highest priority value to communicate audio signals for routing to the audio bus.

8. The controller of claim 7 wherein the microprocessor is configured to receive audio request signals from the modules and to authorize the module having the highest priority value and to communicate audio signals for routing to the audio bus.

9. The controller of claim 8 wherein the microprocessor is configured to receive audio request signals from the modules and to authorize the module having the highest priority value out of the modules communicating audio request signals to communicate audio signals for routing to the audio bus.

10. The controller of claim 9 wherein the microprocessor is configured to transmit audio inquiry signals to the modules for prompting each module to transmit the audio request signal, and wherein the microprocessor is farther configured to authorize the module having the highest priority value out of the modules communicating audio request signals to communicate audio signals for routing to the audio bus.

11. The controller of claim 8 wherein the microprocessor is configured to receive audio interrupt signals from the modules and to authorize the module having the highest priority value out of the modules communicating audio interrupt signals to communicate audio signals for routing to the audio bus in place of the module previously authorized to communicate audio signals for routing to the audio bus.

12. A system, the system comprising:
a vehicle having a number of modules configured to support voice recognition, the voice recognition being used to translate information carried in a microphone signal into module control commands; and
a controller configured to receive the microphone signal and simultaneously route the received microphone signal to each of the modules so that each module receives the same microphone signal, and which is further configured for transmitting a microphone authorization signal for authorizing one of the modules to translate the microphone signal, the authorized module translating the microphone signal into a module control command and automatically executing the translated command without requiring further authorization from the controller.

13. The system of claim 12 wherein the controller further comprises a microprocessor configured to select the module having a highest priority value based on a predefined priority value for each module and to authorize the module having the highest priority value to process the microphone signal.

14. The system of claim 13 wherein the microprocessor is configured to receive microphone request signals from the modules and to authorize the module having the highest priority value out of the modules communicating microphone request signals to process the microphone signal.

15. The system of claim 14 wherein the microprocessor is configured to transmit microphone inquiry signals to the modules for enabling each module to transmit the microphone request signal, and wherein the microprocessor is further configured to authorize the module having the highest priority value out of the modules communicating microphone request signals to process the microphone signal.

16. The system of claim 13 wherein the microprocessor is configured to receive microphone interrupt signals from the modules and to authorize the module having the highest priority value out of the modules communicating microphone interrupt signals to process the microphone signal in place of the module previously authorized to process the microphone signal.

17. The system of claim 13 wherein the router is configured to receive audio signals from each of the modules and to route only one of the received audio signal to an audio bus in the vehicle.

18. The system of claim 17 wherein the microprocessor is configured to select the module having a highest priority value based on a predefined priority value for each module and to authorize the module having the highest priority value to communicate audio signals for routing to the audio bus.

19. The system of claim 17 wherein the microprocessor is configured to receive audio request signals from the modules and to authorize the module having the highest priority value to communicate audio signals for routing to the audio bus.

20. The system of claim 17 wherein the microprocessor is configured to receive audio request signals from the modules and to authorize the module having the highest priority value out of the modules enabled to communicate the audio request signals to process the microphone signal.

21. The system of claim 12 wherein the controller authorizes the at least one module without assessing a relevance of the translated command to the authorized module.

22. A method for use in a vehicle having a number of modules configured to translate audible signals into module control commands, the method comprising:
routing the audible signals to each of the modules, each module receiving the same audible signals;
preventing the modules from translating the received audible signals until authorized; and
authorizing at least one of the modules prevented from translating the audible signals to translate the audible signals, the non-authorized modules never translate the received audible signals.

23. The method of claim 22 further comprising authorizing the at least one of the modules to translate the audible signals with signals communicated from an arbitrator, wherein the arbitrator authorizes the at least one module before the audible signal is translated by any of the modules.

24. The method of claim 23 further comprising the arbitrator authorizing the at least one module without assessing a relevance of the translated module control command to the at least one authorized module.

* * * * *

UNITED STATES PATENT AND TRADEMARK OFFICE
CERTIFICATE OF CORRECTION

PATENT NO. : 7,571,102 B2
APPLICATION NO. : 10/249656
DATED : August 4, 2009
INVENTOR(S) : Karl Douglas Vandivier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this

Seventh Day of September, 2010

David J. Kappos
*Director of the United States Patent and Trademark Office*